United States Patent Office 2,693,369
Patented Nov. 2, 1954

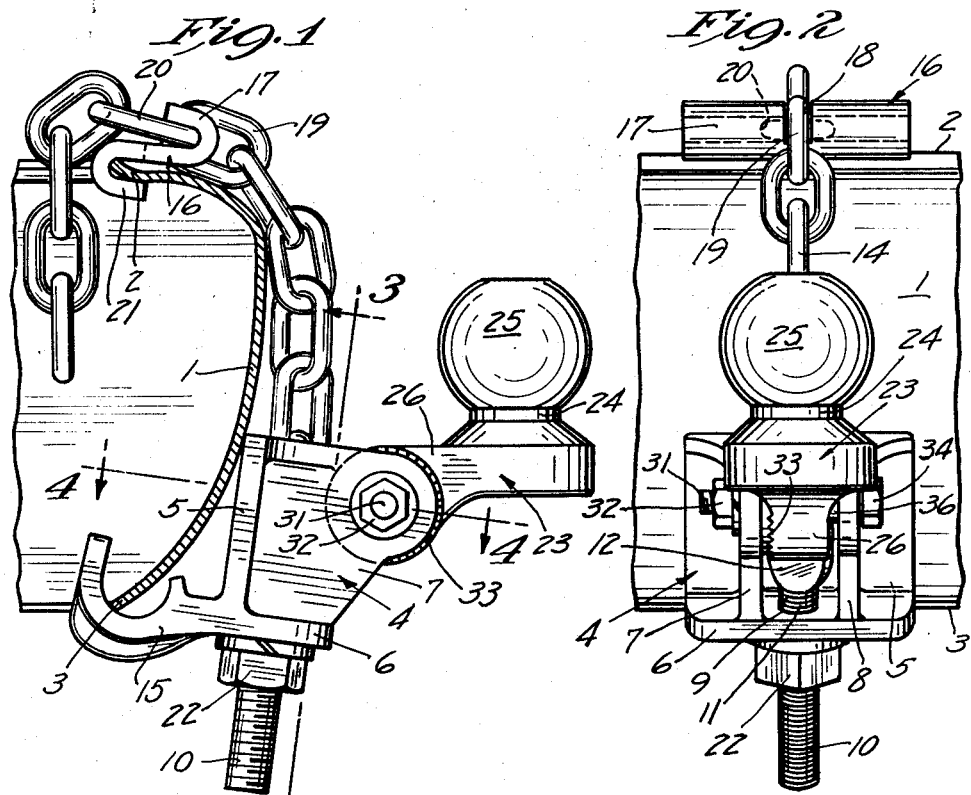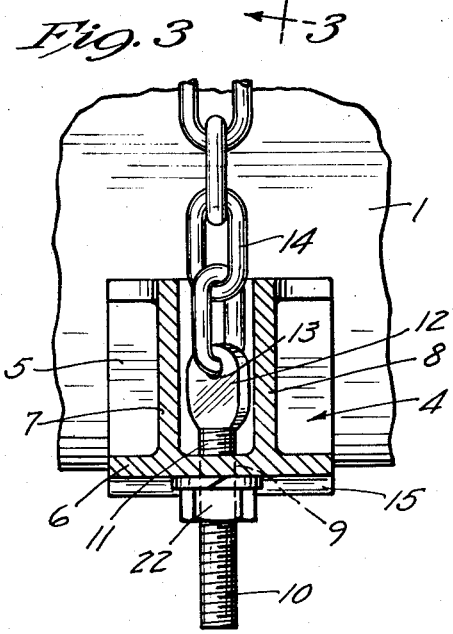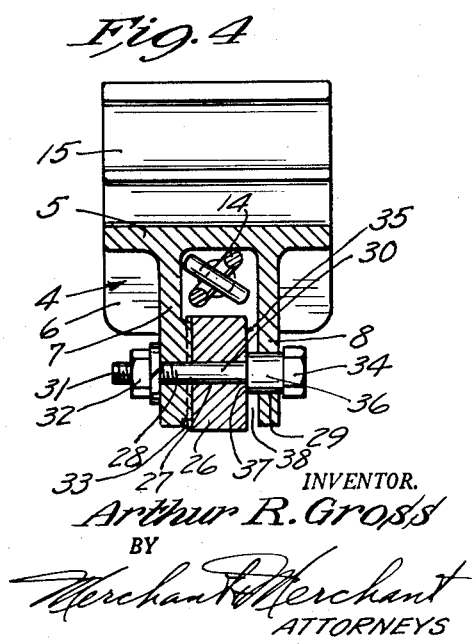

2,693,369

ADJUSTABLE TRAILER HITCH

Arthur R. Gross, St. Paul, Minn.

Application December 22, 1952, Serial No. 327,277

1 Claim. (Cl. 280—502)

My invention relates to trailer hitches, and more particularly to improvements in trailer hitches wherein the hitching ball is clamped to the rear bumper of a conventional automotive vehicle.

In trailer hitches utilizing a hitching ball, the stem upon which the hitching ball is mounted should be in a substantially vertical position to obtain a most secure and safe attachment. However, great difficulty has been experienced in achieving this end in trailer hitches of the type adapted to be secured to the bumpers of automotive vehicles—this because of the considerably different cross-sectional contours of the bumpers of cars of the numerous different makes. The primary object of my invention is the provision of a trailer hitch attachment for bumpers of automotive vehicles, which attachment is provided with a pivotally adjustably-mounted stem and hitching ball, whereby the hitching ball mounting stem may be placed in a vertical position irrespective of the cross-sectional contour of the particular bumper to which the attachment has been detachably secured.

A further object of my invention is the provision of a device of the class above described which has a minimum of working parts, is rugged in construction, durable in use, and inexpensive to produce.

A still further object of my invention is the provision of a device of the class described which is easy, positive, and safe in its adjustment.

The above and still further objects of my invention will become apparent from the following detailed specification, appended claim, and attached drawings.

Referring to the drawings, wherein like characters indicate like parts throughout the several views:

Fig. 1 is a view in side elevation of my novel structure showing the same attached to the bumper of an automotive vehicle, said bumper being shown in cross-section;

Fig. 2 is a view in front elevation of the structure of Fig. 1;

Fig. 3 is a view partly in vertical section and partly in front elevation as seen from the line 3—3 of Fig. 1; and Fig. 4 is a view in fragmentary section taken on the line 4—4 of Fig. 1.

Referring with greater particularity to the drawings, the numeral 1 indicates the rear bumper of an automotive vehicle preferably formed from relatively heavy sheet metal stock bent in generally channel shape or in a reverse C-shape so as to provide upper and lower edges 2 and 3, respectively, which preferably project somewhat forwardly.

Adapted to be detachably attached to the bumper 1, my novel hitch unit comprises a primary section 4 which, preferably and as shown, includes a rear plate 5 and a rearwardly projecting bottom plate 6, which with the back plate 5 form a generally L-shaped member. Rigidly secured to the plates 5 and 6 are a pair of laterally-spaced vertical anchoring flanges 7 and 8. Intermediate the confining flanges 7 and 8 and closely adjacent the rear vertical plate 5, the bottom plate 6 is provided with a generally vertical opening 9 adapted to snugly receive the threaded end 10 of a clamping bolt 11. Preferably and as shown, the clamping bolt 11 is provided with an enlarged head 12 through an opening 13 in which the bottom link of a chain 14 passes. Projecting forwardly from the lower portion of the primary section 4, and preferably formed integrally therewith, is an upwardly opening hook 15 adapted to receive the lower edge 3 of the bumper 1 therein. An elongated double-acting cross-sectionally S-shaped hook element 16 is provided with a hook element 17 which is centrally slotted, as at 18, to receive a vertically disposed link 19 while encompassing therein a horizontally disposed link 20. The downwardly and rearwardly disposed hook 21 is shown as receiving therein the forwardly disposed edge 2 of the bumper 1. With this arrangement, it should be obvious that tightening of the nut 22 on the screw-threaded end 10 of the clamping bolt 11 should result in secure attachment of the primary section 4 to the bumper 1.

A secondary section 23 is shown as being provided adjacent its rear end with an upstanding stem 24 upon which is mounted a hitching ball 25. At its forward end the section 23 is provided with an anchoring tongue 26 which is adapted to be loosely received between the anchoring flange 7 and 8. Anchoring tongue 26 is provided with a transverse horizontal opening 27 which is axially alignable with opening 28 through anchoring flange 7 and opening 29 through anchoring flange 8. An anchoring bolt 30 extends through the aligned openings 27, 28, and 29 with its threaded end 31, upon which is mounted a nut 32, projecting outwardly from the flange 7. As shown, the anchoring flange 7 and the adjacent face of the anchoring tongue 26 are provided with circumferentialy-spaced cooperating gripping teeth 33. The end of the anchoring bolt 30 opposite the nut 32 is provided with a gripping surface, preferably and as shown in the nature of an enlarged head 34. Interposed between the head 34 and the untoothed side edge surface 35 of the anchoring tongue 26 is a diametrically enlarged axially extended portion 36 which extends snugly through the opening 29 in the anchoring flange 8 and terminates in an annular shoulder 37, which engages the surface 35. As shown, the axial length of the enlarged shoulder forming portion 36 is greater than the distance between the surface 35 and the outer surface of the flange 8. Therefore, tightening of the nut 32 on the screw-threaded end 31 of the anchoring bolt 30 causes the shoulder forming portion 36 to engage the surface 35 of the tongue 26 and the nut 32 to engage the outer surface of the toothed anchoring flange 7—thereby causing locking engagement between the cooperating gripping teeth 33. It will be noted that the space 38 between the surface 35 of the anchoring tongue 26 and the anchoring flange 8 is greater than the axial depth of the cooperating gripping teeth 33 so as to permit pivotal movements of the anchoring tongue 26 with respect to the anchoring flanges 7 and 8 when the nut 32 is loosened.

With the above arrangement, it should be obvious that irrespective of the position which the primary section 4 assumes, upon clamping action of the chain 14 and clamping bolt 11, that the hitching ball mounting stem 24 may be placed in a vertical position by manipulating the anchoring bolt 30.

My invention has been thoroughly tested and found to be completely satisfactory for the accomplishment of the above objects, and while I have shown a commercial embodiment of my invention it should be obvious that same is capable of modification without departure from the scope of the invention as defined by the appended claim.

What I claim is:

A trailer hitch unit for detachable attachment to rear vehicle bumpers having different cross-sectional contours, said trailer hitch unit comprising a primary section adapted to be disposed at the rear of and provided with means for detachable anchorage to the rearwardly disposed faces of said bumpers, and a relatively adjustable secondary section comprising a stem normally disposed on a vertical axis and carrying a hitching ball, said primary section having rigid laterally-spaced vertical anchoring flanges, said secondary section having a forwardly disposed anchoring tongue loosely received between said flanges, a headed nut-equipped anchoring bolt projecting through axially aligned transverse openings in said anchoring flanges and anchoring tongue, one face of said tongue and the abutting face of the flange adjacent the nut-equipped end of said anchoring bolt being provided with circumferentially-spaced cooperating gripping teeth of an axial depth permitting pivotal movements of said tongue with respect to said anchoring flanges when said bolt is in an untightened position, and a bearing sleeve, said sleeve being interposed between the untoothed side surface of said tongue and the head on said bolt and having an axial length greater than the distance between said untoothed side surface and the outer surface of said untoothed clamping flange whereby tightening action applied to said nut will cause clamping engagement between said teeth.

References Cited in the file of this patent

UNITED STATES PATENTS

| Number | Name | Date |
|---|---|---|
| 2,035,669 | Pribil | Mar. 31, 1936 |
| 2,458,667 | Williams | Jan. 11, 1949 |